United States Patent
Tang et al.

(10) Patent No.: US 8,348,530 B2
(45) Date of Patent: Jan. 8, 2013

(54) KEYBOARD WITH MULTI-ANGLE SUPPORT

(75) Inventors: Feng-Xiang Tang, Shenzhen (CN);
Xian-Wei Ma, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 409 days.

(21) Appl. No.: 12/813,525

(22) Filed: Jun. 11, 2010

(65) Prior Publication Data
US 2011/0175814 A1 Jul. 21, 2011

(30) Foreign Application Priority Data
Jan. 16, 2010 (CN) .......................... 2010 1 0300374

(51) Int. Cl.
*G06F 3/02* (2006.01)
*G06F 1/16* (2006.01)
(52) U.S. Cl. ............. 400/472; 361/679.12; 361/679.59; 400/681; 400/682
(58) Field of Classification Search .................. 400/681, 400/682, 472, 489; 345/168; 361/679.12, 361/679.59
See application file for complete search history.

(56) References Cited

U.S. PATENT DOCUMENTS

| | | | | |
|---|---|---|---|---|
| 4,402,624 A * | 9/1983 | Stahl et al. | ..................... | 400/681 |
| 4,516,508 A * | 5/1985 | Kako et al. | ......................... | 108/7 |
| 4,773,783 A * | 9/1988 | Dickie | ........................... | 400/682 |
| 5,732,928 A * | 3/1998 | Chang | ........................... | 248/688 |
| 2011/0291938 A1* | 12/2011 | Wu et al. | ........................ | 345/168 |

* cited by examiner

*Primary Examiner* — Daniel J Colilla
(74) *Attorney, Agent, or Firm* — Altis Law Group, Inc.

(57) ABSTRACT

A keyboard includes a main body and a support in the main body. The main body includes a bottom defining two slots and two opposite sidewalls each defining a receiving hole. The slots communicate with the receiving holes, respectively. The support includes a rotation member, two driving members and two connecting members received in the two slots, respectively. Each connecting member includes a first arm and a second arm, wherein two ends of the first arm are rotatably connected to the rotation member and the second arm, respectively, the second arm is further rotatably connected to one of the driving members, and the second arm moves together with the one of the two driving members, causing the connecting ends of the first arm and the second arm to extend out of one of the two slots.

7 Claims, 7 Drawing Sheets

KEYBOARD WITH MULTI-ANGLE SUPPORT

BACKGROUND

1. Technical Field

The present disclosure relates to keyboards and, particularly, to a keyboard with multi-angle support.

2. Description of Related Art

A keyboard usually includes a pair of supports for supporting the keyboard at an angle to be more comfortable for a user. The supports can usually be folded into the keyboard when not in use, pulled out to different positions according to user preference. The limited number of positions are not enough to satisfy users' needs.

BRIEF DESCRIPTION OF THE DRAWINGS

The components of the drawings are not necessarily drawn to scale, the emphasis instead being placed upon clearly illustrating the principles of an keyboard with multi-angle support. Moreover, in the drawings, like reference numerals designate corresponding parts throughout several views.

DETAILED DESCRIPTION

Figure 1:
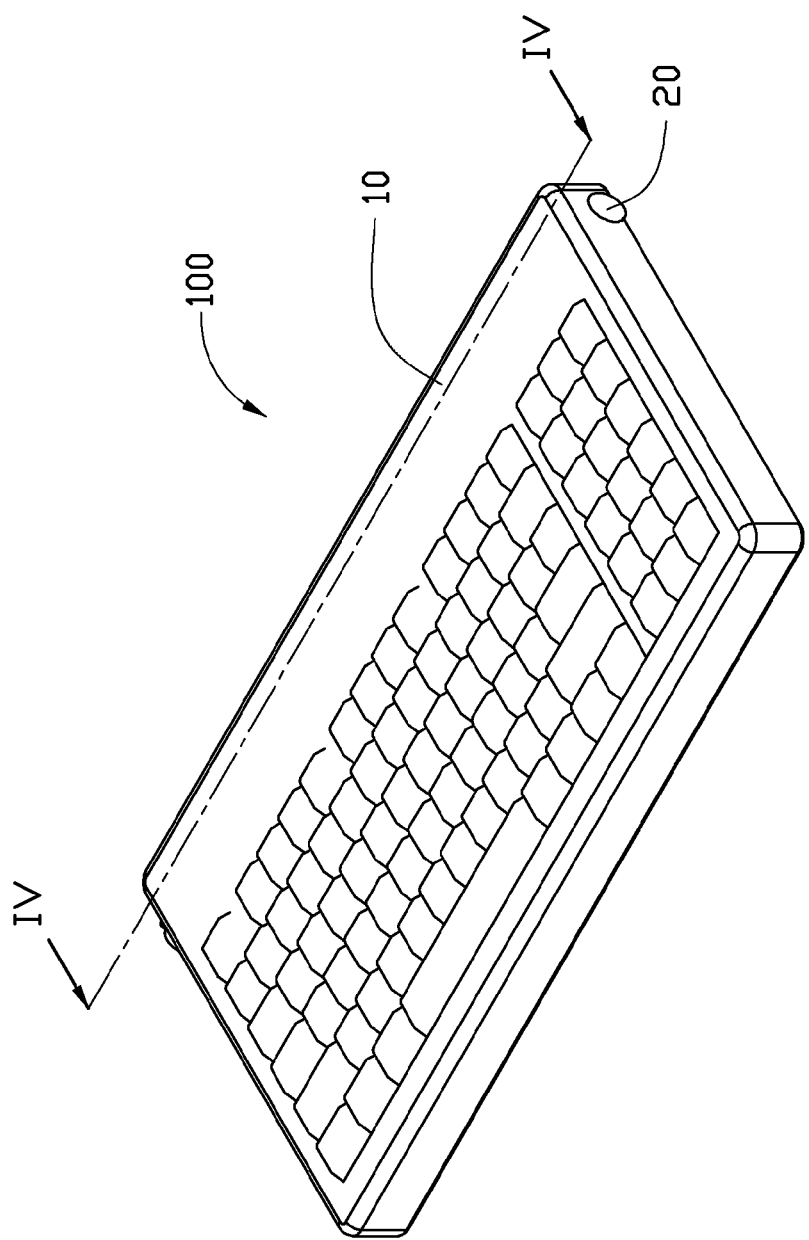
FIG. 1 is an isometric view of a keyboard with multi-angle support according to an embodiment.

Referring to FIG. 1, a keyboard 100 according to an embodiment is illustrated. The keyboard 100 includes a hollow main body 10 and a support 20 accommodated in the main body 10 for adjusting the orientation of the main body 10 relative to a supporting surface, such as a desktop.

Figure 2:
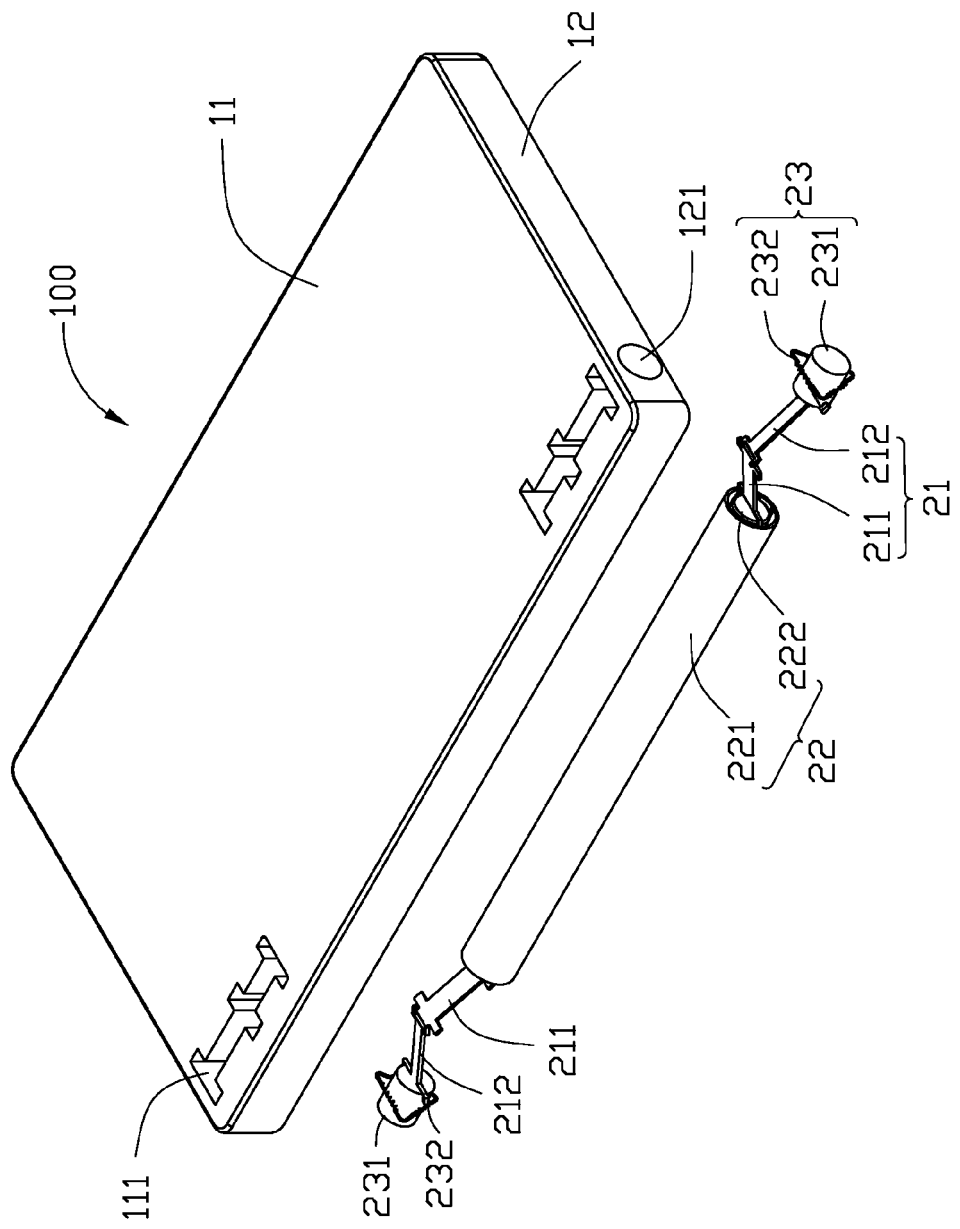
FIG. 2 is a partially exploded, inverted view of the keyboard of FIG. 1.
Figure 3:
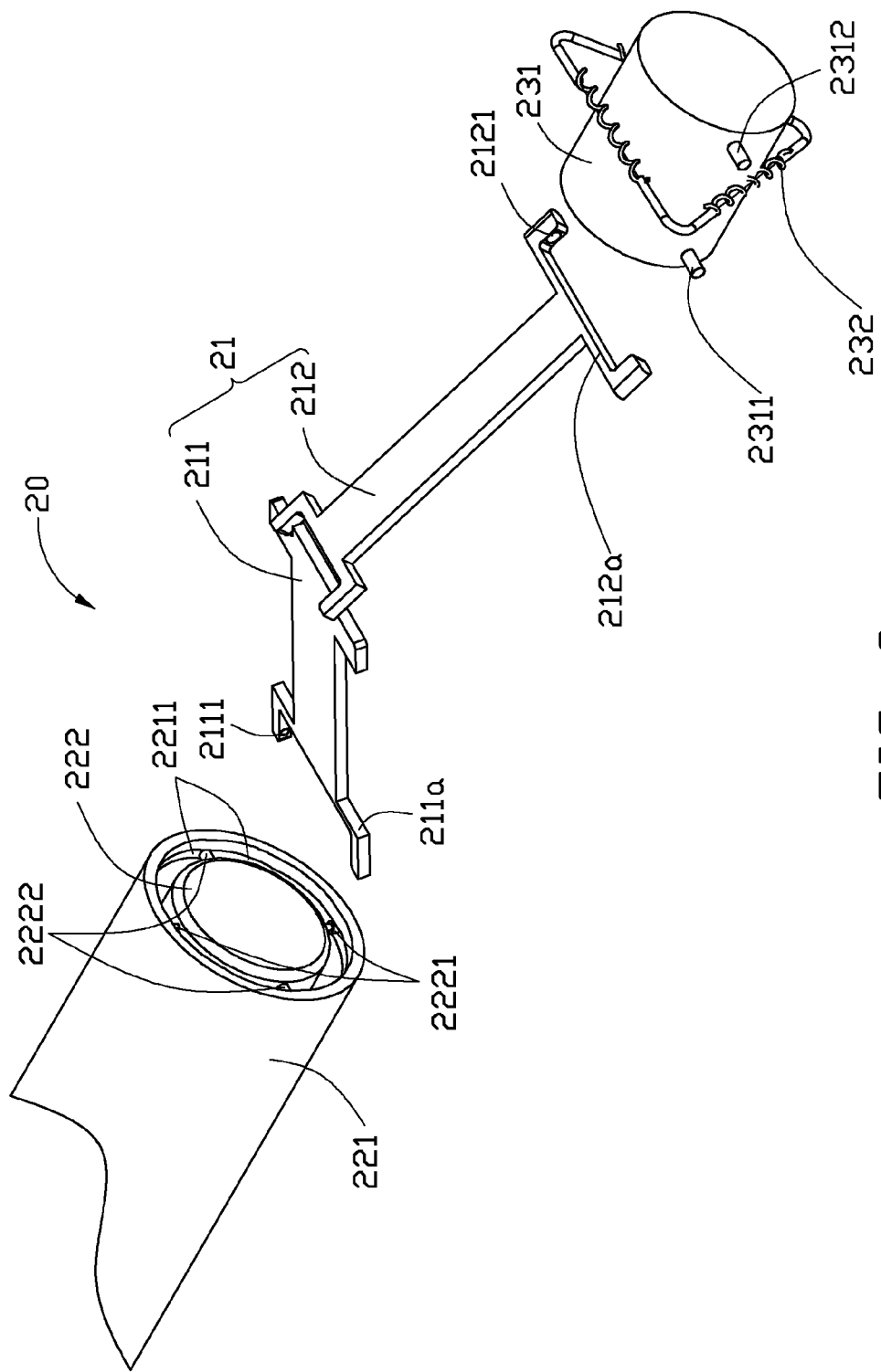
FIG. 3 is an enlarged partial view of the keyboard of FIG. 2, with certain components omitted for clarity.

Referring to FIGS. 2-3, the main body 10 includes a bottom 11 and two opposite sidewalls 12. Each sidewall 12 defines a receiving hole 121. The bottom 11 defines two slots 111 adjacent to the receiving hole 121. The slots 111 communicate with the receiving holes 121, respectively.

The support 20 includes two connecting members 21, a rotation member 22, and two driving members 23.

The two connecting members 21 are received in the two slots 111, respectively. Each of the two connecting members 21 comprises a first arm 211 and a second arm 212. Two ends of the first arm 211 are rotatably connected to the rotation member 21 and the second arm 211, respectively. The second arm 212 is further rotatably connected to one of the driving members 23, and moves together with the one of the two driving members 23, causing part of the first arm 211 and part of the second arm 212 to extend out of one of the two slots 111. The end of the first arm 211 which connects to the rotation member 21 forms a first fork 211a, and the end of the second arm 212 which connects to the driving number 23 forms a second fork 212a. Two first axle notches 2111 are defined in the sidewalls of the first fork 211a and face each other. Two second axle notches 2121 are defined in the sidewalls of the second fork 212a and face each other.

The rotation member 22 includes a sleeve 221 fixed in the main body 10, and a shaft 222 pivotably received in the sleeve 221. The sleeve 221 is aligned with the receiving holes 121 of the main body 10. The shaft 222 has an outer radius substantially smaller than the inner radius of the sleeve 221. Both ends of the shaft 222 are pivotably connected to the first arms 211. In the embodiment, the shaft 222 protrudes two symmetrical posts 2222 from its outer surface at each end. Free ends of the posts 2222 are rotatably received in the first axle notches 2111, thus connecting the shaft 222 to the first arms 211. The sleeve 221 defines one annular groove 2211 in its inner surface at each end. In one embodiment, the shaft 222 also includes two symmetrical retractable pins 2221 protruding from its outer surface at each end. Free ends of the retractable pins 2221 are received in the annular groove 2211.

In assembly, the shaft 222 is firstly inserted into the sleeve 221. In the process, the retractable pins 2221 engages with the inner surface of the sleeve 221 to be slightly retracted, until the ends of the pins 2221 are received in the annular groove 2211, rotatably connecting the shaft 222 to the sleeve 221. In another embodiment, the retractable pins 2221 may be replaced with a retractable flange extending axially outward from the outer surface of the shaft 221.

The driving member 23 includes a knob 231 and a retaining member 232.

Figure 4:
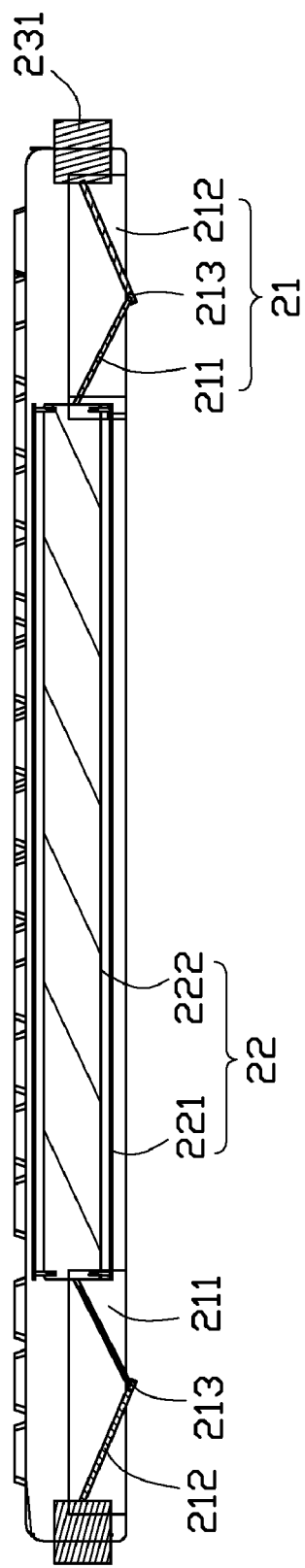
FIG. 4 is a cross-sectional view of the keyboard of FIG. 1, taken along line IV-IV of FIG. 1, showing the keyboard in a first orientation.
Figure 5:
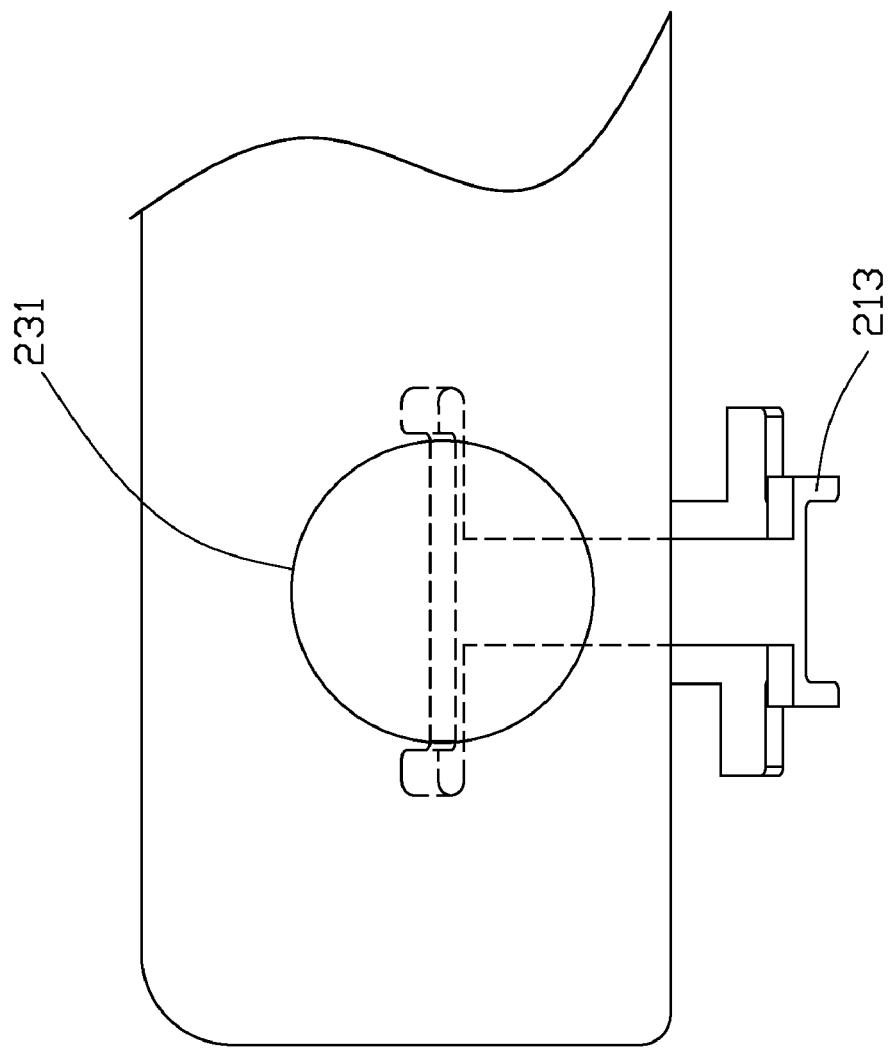
FIG. 5 is a side view of the keyboard of FIG. 4.

Referring also to FIGS. 4-5, the keyboard 100 stays in a first orientation with the connecting ends 213 of the arms 211 and 212 extending out of the slots 111 and resisting the support surface. To adjust the orientation of the keyboard 100, the knobs 231 can be caused to move inward or outward. The second arms 212 thus move together with the knobs 231, causing the connecting ends 213 to move toward or away from the bottom 11 of the main body 10. A plurality of tilting angles relative to the support surface is thus available for the keyboard 100. Once a desired orientation is obtained, the knobs 231 are stopped and can be positioned by the triangle spring 232.

Figure 6:
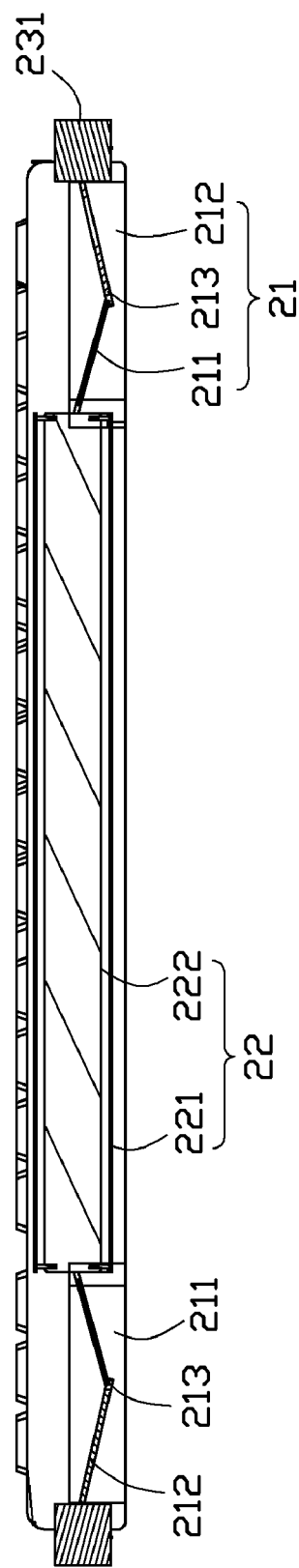
FIG. 6 is similar to FIG. 4, but showing the keyboard in a second orientation.
Figure 7:
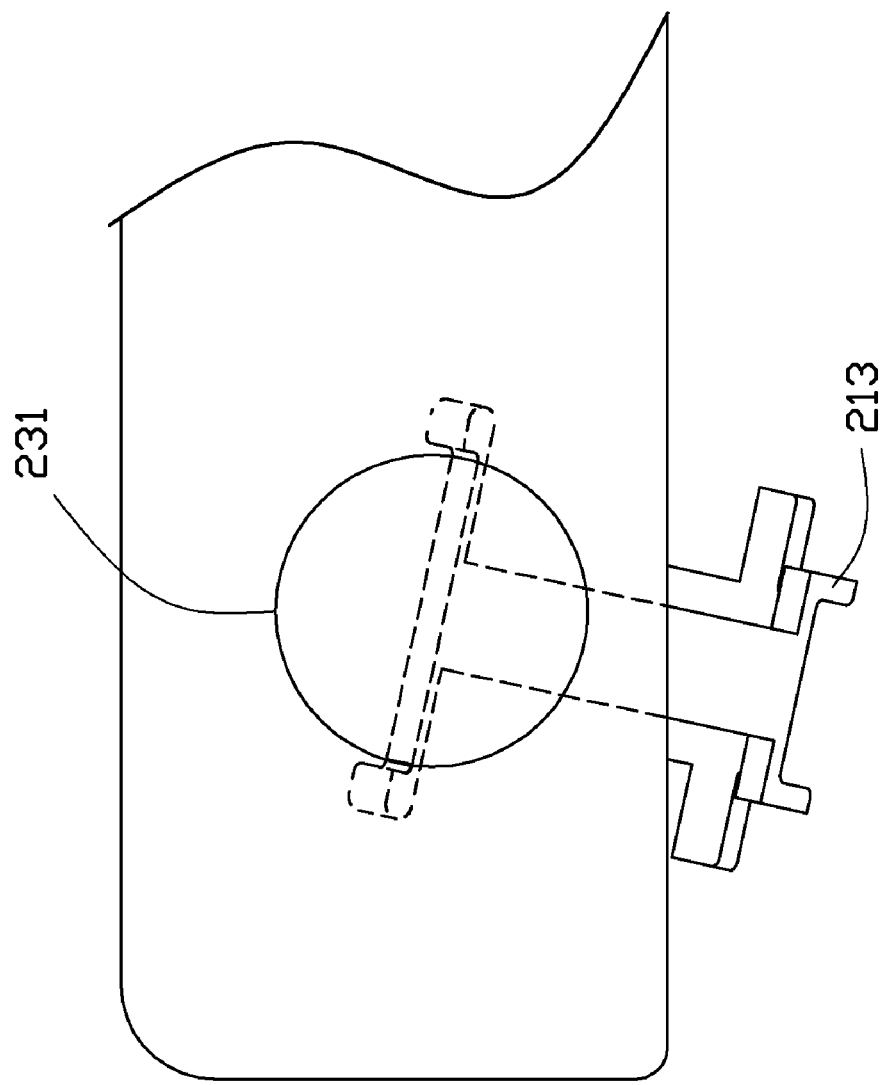
FIG. 7 is a side view of the keyboard of FIG. 6.

Referring also to FIGS. 6-7, to adjust the orientation of the keyboard 100, the knobs 231 can also be rotated to cause the arms 211 and 212 to rotate. When the two knobs 231 are both rotated in the same direction, each connecting member 21 rotates in the same direction with the corresponding knob 231. In this way, a user can adjust the height of the connecting member 21.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A keyboard comprising:
   a main body comprising a bottom defining two slots and two opposite sidewalls each defining a receiving hole, wherein the slots communicate with the receiving holes, respectively; and
   a support comprising:
   a sleeve fixed in the main body;
   a shaft rotatably received in the sleeve;
   two knobs movably received in the receiving holes, respectively;
   two retaining members fixed in the inner side of the receiving hole, coiling around the knobs, respectively, and applying a tightening force to the knobs to retain the knobs in the receiving holes;

two connecting members received in each of the two slots, respectively, each comprising a first arm and a second arm, wherein two ends of the first arm are rotatably connected to the shaft and the second arm, respectively, the second arm is further rotatably connected to one of the two knobs, and moves together with the one of the two knobs, causing part of the first arm and the second arm to extend out of one of the two slots.

2. The keyboard as claimed in claim 1, wherein the sleeve is aligned with the receiving holes of the main body.

3. The keyboard as claimed in claim 1, wherein the sleeve defines one annular groove in its inner surface at each end, and the shaft comprises two retractable pins protruding from its outer surface at each end, and the free ends of the retractable pins are received in the annular groove.

4. The keyboard as claimed in claim 1, wherein the sleeve defines one annular groove in its inner surface at each end, each end of the shaft defines a retractable flange extending axially outward from the outer surface of the shaft, and received in the annular groove.

5. The keyboard as claimed in claim 1, wherein the retaining members are triangle springs made up of three coil springs connected end to end.

6. The keyboard as claimed in claim 1, wherein the end of each first arm connected to the shaft forms a first fork, two first axle notches are defined in the sidewalls of the first fork and face each other; the shaft protrudes two symmetrical posts from its outer surface at each end, and the free ends of the posts are rotatably received in the first axle notches, thus connecting the shaft to the first arms.

7. The keyboard as claimed in claim 1, wherein the end of each second arm connected to its respective knob forms a second fork, two second axle notches are defined in the sidewalls of the second fork and face each other; each knob protrudes two protruding posts at one end, and the posts are rotatably received in the second notches, thus connecting the knobs to the second arms, respectively.

* * * * *